(12) United States Patent
Ramakrishnan et al.

(10) Patent No.: US 9,607,641 B1
(45) Date of Patent: Mar. 28, 2017

(54) BOND PAD SHARING FOR POWERING MULTIPLE WRITERS OF A RECORDING HEAD

(71) Applicant: Seagate Technology LLC, Cupertino, CA (US)

(72) Inventors: Narayanan Ramakrishnan, Eden Prairie, MN (US); Declan Macken, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/007,756

(22) Filed: Jan. 27, 2016

(51) Int. Cl.
  *G11B 11/00*  (2006.01)
  *G11B 5/60*  (2006.01)
  *G11B 5/00*  (2006.01)

(52) U.S. Cl.
  CPC .... *G11B 5/6005* (2013.01); *G11B 2005/0021* (2013.01)

(58) Field of Classification Search
  None
  See application file for complete search history.

(56) References Cited

U.S. PATENT DOCUMENTS

| | | | |
|---|---|---|---|
| 5,298,641 A | 3/1994 | Stewen | |
| 5,610,783 A * | 3/1997 | Maffitt | G11B 5/3106 360/234.5 |
| 5,768,068 A | 6/1998 | Eckberg et al. | |
| 5,896,249 A | 4/1999 | Fontana, Jr. et al. | |
| 6,396,667 B1 * | 5/2002 | Zhang | G11B 5/5552 360/294.3 |
| 7,119,990 B2 | 10/2006 | Bajorek et al. | |
| 7,589,936 B1 * | 9/2009 | McFadyen | G11B 5/17 360/123.1 |
| 8,159,780 B2 | 4/2012 | Brand | |
| 8,432,636 B2 | 4/2013 | Brand | |
| 8,947,807 B2 * | 2/2015 | Heim | G11B 5/012 360/110 |
| 2005/0024775 A1 * | 2/2005 | Kurita | G11B 5/6064 360/234.3 |
| 2005/0190495 A1 * | 9/2005 | Lille | G11B 5/3133 360/125.75 |
| 2006/0056110 A1 * | 3/2006 | Kato | G11B 5/314 360/234.3 |
| 2006/0203387 A1 * | 9/2006 | White | G11B 5/484 360/234.5 |
| 2007/0274005 A1 * | 11/2007 | Zhu | G11B 5/102 360/234.4 |

(Continued)

*Primary Examiner* — Peter Vincent Agustin
(74) *Attorney, Agent, or Firm* — Hollingsworth Davis, LLC

(57) ABSTRACT

A slider of a magnetic recording head comprises a plurality of electrical bond pads coupled to bias sources. A first writer on the slider is coupled between first and second bond pads. A second writer on the slider is coupled between third and fourth bond pads. At least one heater is coupled between two of the first, second, third, and fourth bond pads. The first writer can have a center-tap coupled to first and second bond pads. The second writer can have a center-tap coupled to third and fourth bond pads. A first writer heater can be coupled between the center-tap of the second writer and the ground pad. A second writer heater can be coupled between the center-tap of the first writer and the ground pad.

22 Claims, 9 Drawing Sheets

(56) References Cited

U.S. PATENT DOCUMENTS

| | | | |
|---|---|---|---|
| 2009/0195930 A1* | 8/2009 | Lille | G11B 5/102 360/234.5 |
| 2009/0251821 A1* | 10/2009 | Song | G11B 5/1278 360/110 |
| 2009/0262460 A1* | 10/2009 | Hanchi | G11B 5/3133 360/235.4 |
| 2011/0019311 A1* | 1/2011 | Greminger | G11B 5/4853 360/234.5 |
| 2012/0327529 A1* | 12/2012 | Hutchinson | G11B 5/6005 360/31 |
| 2014/0177083 A1* | 6/2014 | Heim | G11B 5/012 360/46 |

* cited by examiner

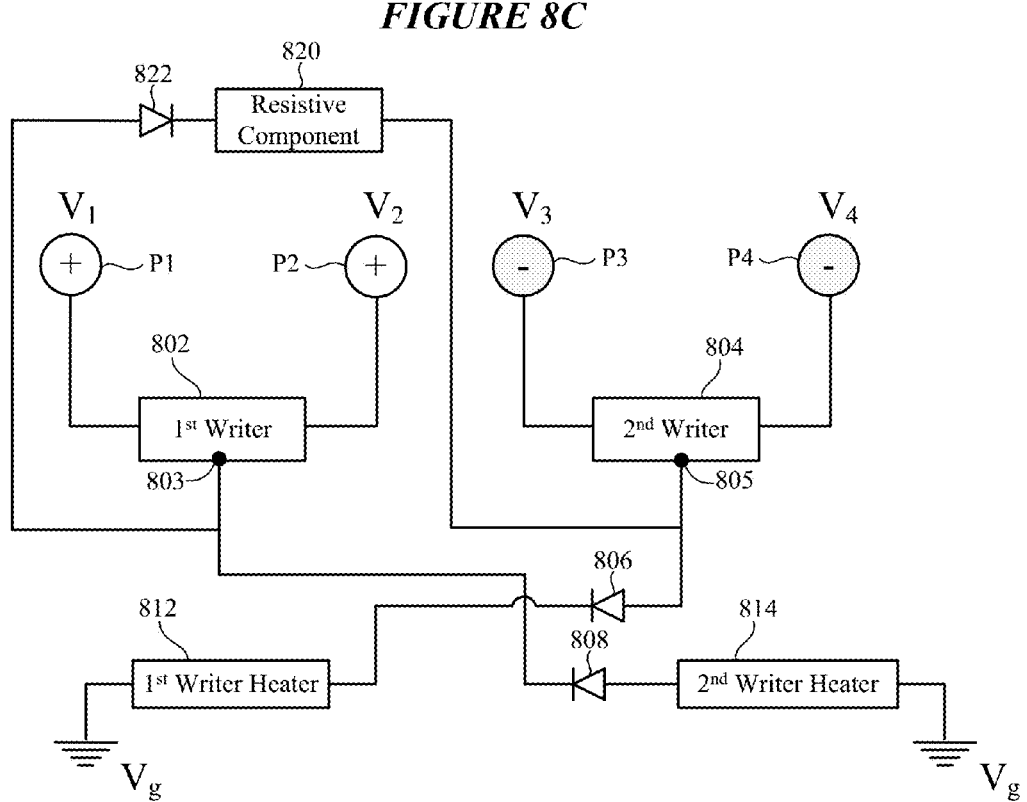

US 9,607,641 B1

BOND PAD SHARING FOR POWERING MULTIPLE WRITERS OF A RECORDING HEAD

SUMMARY

Various embodiments are directed to an apparatus which includes a slider of a magnetic recording head comprising a plurality of electrical bond pads coupled to bias sources. A first writer on the slider is coupled between first and second bond pads. A second writer on the slider is coupled between third and fourth bond pads. At least one heater is coupled between two of the first, second, third, and fourth bond pads.

According to other embodiments, an apparatus includes a slider of a magnetic recording head comprising a plurality of electrical bond pads coupled to bias sources and a ground pad. A first writer having a center-tap is coupled to first and second bond pads. A second writer having a center-tap is coupled to third and fourth bond pads. A first writer heater is coupled between the center-tap of the second writer and the ground pad. A second writer heater is coupled between the center-tap of the first writer and the ground pad.

In accordance with some embodiments, an apparatus includes a slider of a magnetic recording head comprising a plurality of electrical bond pads coupled to bias sources and a ground pad. A first writer having a center-tap is coupled to first and second bond pads. A second writer having a center-tap is coupled to third and fourth bond pads. A first writer heater is coupled between the center-tap of the second writer and the ground pad. A first diode is coupled between the center-tap of the second writer and the first writer heater. A second writer heater is coupled between the center-tap of the first writer and the ground pad. A second diode is coupled between the center-tap of the first writer and the second writer heater. A resistive component is coupled between the center-tap of first writer and the center-tap of the second writer. A third diode is coupled between the center-tap of the first writer and the resistive component.

The above summary is not intended to describe each disclosed embodiment or every implementation of the present disclosure. The figures and the detailed description below more particularly exemplify illustrative embodiments.

BRIEF DESCRIPTION OF THE DRAWINGS

FIGS. 8A, 8B, and 8C illustrate circuits that support bond pad sharing between a multiplicity of writers, a multiplicity of writer heaters, and a resistive component in accordance with various embodiments.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Data storage systems commonly include one or more transducers that write and read information to and from a magnetic storage medium. A recording transducer, for example, incorporates several distinct electrical and, in some implementations, optical components that require specified voltages/currents to operate properly. Representative examples of such electrical transducer components include one or more readers, one or more reader heaters, one or more writers, and one or more writer heaters, among other possible components. Some recording transducers incorporate one or more sensors, such as contact sensors, each requiring specified operating voltages/currents. Each of the electrically activated components of a transducer is electrically coupled to corresponding electrical contacts or bond pads of the transducer. Depending on the particular design of a given transducer, various bond pads can be configured as voltage sources, current sources, and ground contacts, and can also send and receive signals (e.g., write signals, readback signals, sensor signals, control signals). Because bond pads take up appreciable space on a transducer and adding bond pads can be very expensive due to changes in design and fabrication processes needed to accommodate such additional bond pads, it is desirable to minimize both the number of bond pads and changes to the bond pad configuration of a transducer.

An issue with adding additional components or any electrical feature in general to an existing slider or HGA is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is to share an existing bond pad between two or more electrical devices on the slider.

Sharing a common bond pad between two or more electrical components (e.g., readers) can raises the issue of bias contention as well as degraded performance (e.g., degraded common mode rejection). Such issues can be addressed by addition or modification of biasing and filtering circuitry, although this approach adds some degree of complexity to the design. An alternative and simpler approach involves pad sharing between electrical components having the same or similar biasing and/or filtering requirements. Another example of this approach involves a bond pad shared between electrical components that operate at different times or can be operated alternately.

Figure 1:
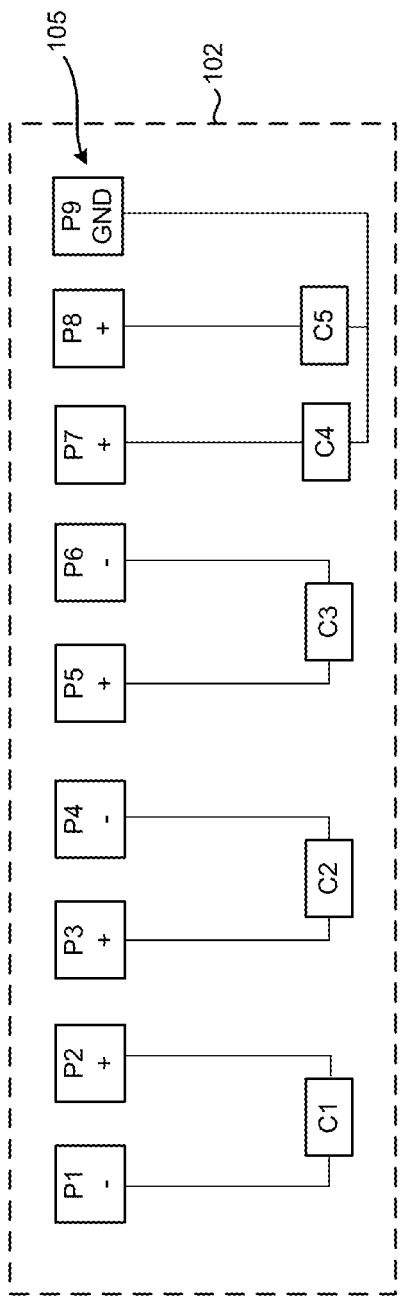
FIG. 1 illustrates an embodiment of a recording transducer that does not utilize pad sharing.
Figure 2:
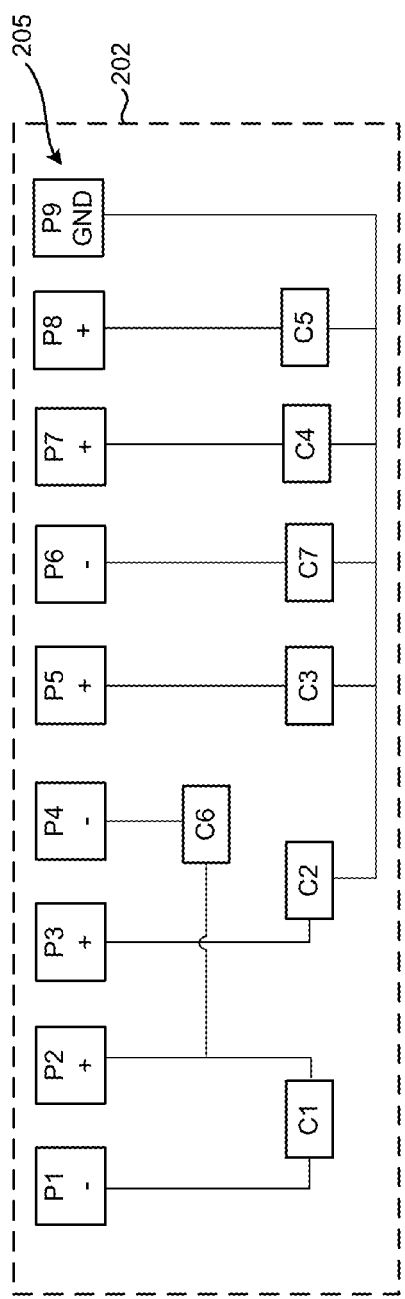
FIG. 2 illustrates a recording transducer that utilizes pad sharing according to embodiments of the present disclosure.

FIG. 1 illustrates an embodiment of a recording transducer that does not utilize pad sharing according to the present disclosure. FIG. 2 illustrates a recording transducer that utilizes pad sharing according to embodiments of the present disclosure. The bond pad layout shown in FIG. 1 is the same as that shown in FIG. 2, and the electrical components identified as C1-C5 in FIG. 1 are the same as those shown as components C1-C5 in FIG. 2 for purposes of illustration. It is understood that the bond pad layout, components, and wiring configuration shown in FIGS. 1 and 2 are provided for non-limiting illustrative purposes.

FIG. 1 illustrates a slider 102 that supports a recording transducer comprising a multiplicity of electrical components (C1-C5) coupled to a set 105 of bond pads (P1-P9). The set 105 of bond pads includes eight electrical bond pads (P1-P8) and one ground pad (P9, also referred to herein simply as ground). The term "electrical bond pad" refers to a bond pad that is coupled to a bias source, such as a voltage or current source (AC or DC), that provides power for an electrical component. The slider 102 shown in FIG. 1 utilizes eight electrical bond pads (P1-P8) to power five electrical components (C1-C5).

Electrical components C1-C3 can be referred to as dual-ended components, since each is coupled between a pair of electrical bond pads (e.g., one end of C1 is connected to negative pad P1 and the other end of C1 is connected to positive pad P2). Each dual-ended component requires two electrical bond pads for proper operation. Electrical components C4 and C5 can be referred to as single-ended components, since each is coupled between a single electrical bond pad and ground (e.g., one end of C5 is connected to positive pad P8 and the other end of C5 is connected to ground pad P9). Each single-ended component requires one electrical bond pad for proper operation. It is noted that the polarity of the electrical bond pads can change during operation, such that a given pad can be at a positive potential during one operating state and at a negative potential during another operating state.

FIG. 2 shows an apparatus according to various embodiments that includes a slider 202 comprising a plurality of electrical bond pads coupled to bias sources 205. The slider 202 further comprises a plurality of electrical components each coupled to at least one of the electrical bond pads. At least one of the electrical bond pads is shared between a plurality of the electrical components. According to some embodiments, the slider 202 supports a recording transducer comprising a multiplicity of electrical components (C1-C7) coupled to a set 205 of bond pads (P1-P9). As previously discussed, the set 205 of bond pads is the same as the bond pad set 205 shown in FIG. 1 (i.e., 8 electrical bond pads and 1 ground pad). In contrast to the slider 205 illustrated in FIG. 1 which supports five electrical components using eight electrical bond pads, the slider 205 shown in FIG. 2 supports seven electrical components while using the same number (i.e., 8) of electrical bond pads.

In FIG. 2, electrical bond pad P2 is shared between electrical components C1 and C6, thereby freeing up one electrical bond pad for other use or elimination. The electrical component C2 in FIG. 2, which performs the same function as C2 in FIG. 1, is implemented as a single-ended component, thereby freeing up one electrical bond pad for other use or elimination. By freeing up two electrical bond pads in the illustrative slider 202 shown in FIG. 2, two additional components (C6 and C7) have been added to the slider 202 as compared to the implementation illustrated in FIG. 1.

The need for sharing of electrical bond pads has intensified in the advent of recording heads configured for heat-assisted magnetic recording, also referred to as energy-assisted magnetic recording (EAMR), thermally-assisted magnetic recording (TAMR), and thermally-assisted recording (TAR). In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design.

Figure 3:
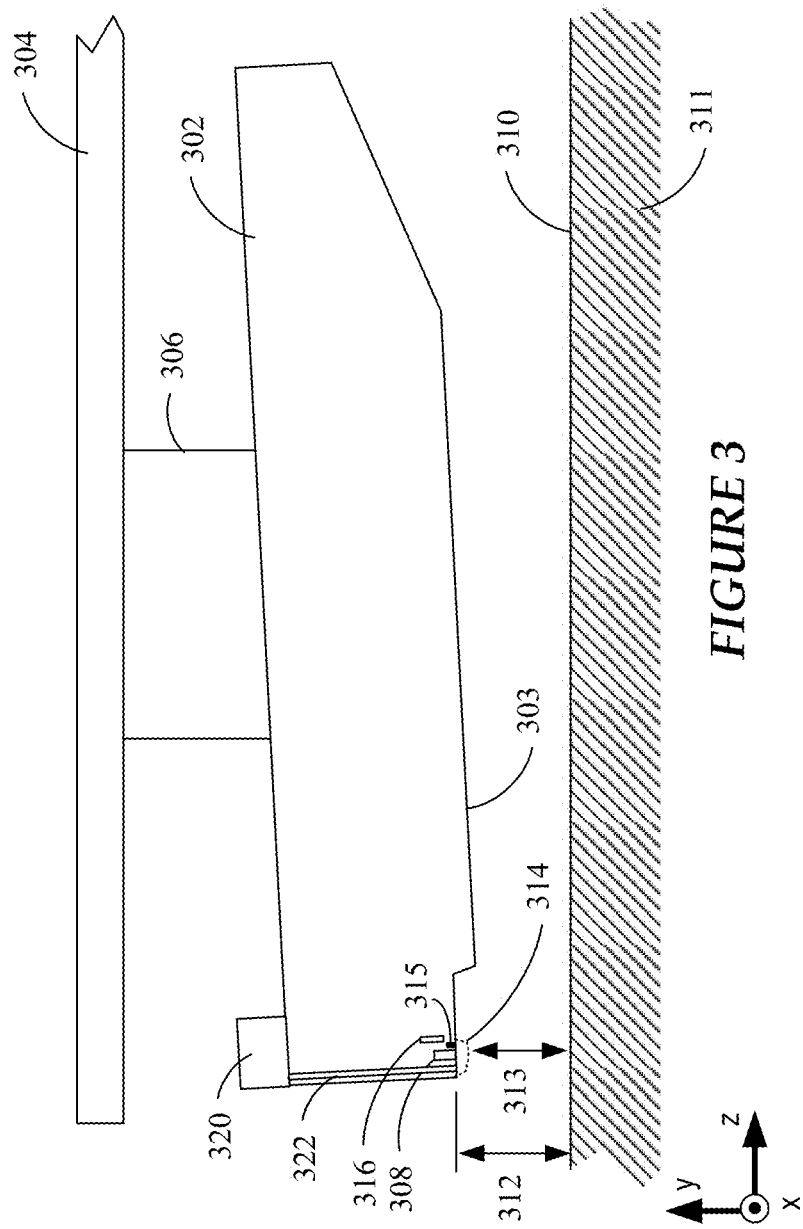
FIG. 3 shows a side view of a read/write transducer configured for heat-assisted magnetic recording (HAMR) according to a representative embodiment.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via a heater 316. A thermal sensor 315 is shown situated at or near the close point 314 (e.g., adjacent the read/write transducers 308, such as near the near-field transducer) or can be positioned at other location of the ABS 303.

Figure 4:
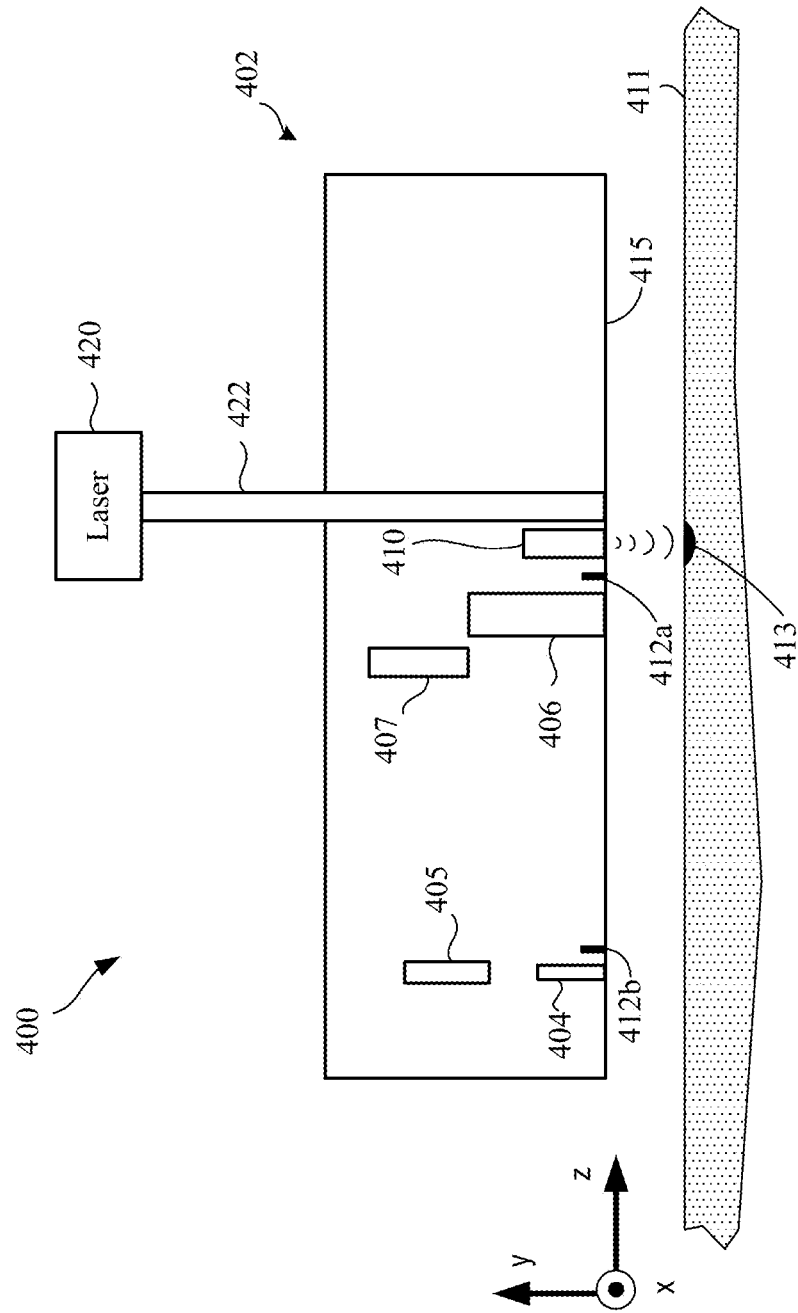
FIG. 4 shows a HAMR head arrangement in accordance with various embodiments.

FIG. 4 shows a HAMR head arrangement 400 in accordance with various embodiments. The recording head arrangement 400 includes a slider 402 positioned proximate a rotating magnetic medium 411. The slider 402 includes a reader 404 and a writer 406 proximate the ABS 415 for respectively reading and writing data from/to the magnetic medium 411. The writer 406 is located adjacent a near-field transducer (NFT) 410 which is optically coupled to a light source 420 (e.g., laser diode) via a waveguide 422. The light source 420 can be mounted external, or integral, to the slider 402. The light source 420 energizes the NFT 410 via the waveguide 422. The writer 406 includes a corresponding heater 407, and the reader 404 includes a corresponding heater 405 according to various embodiments. The writer heater 407 can be powered to cause protrusion of the ABS 415 predominately in the ABS region at or proximate the writer 406, and the reader heater 405 can be powered to cause protrusion of the ABS 415 predominately in the ABS region at or proximate the reader 404. Power can be controllably delivered independently to the heaters 407 and 405 to adjust the fly height (e.g., clearance) of the slider 402 relative to the surface of the recording medium 411. One or more thermal sensors 412a, 412b can be situated at various locations on the slider 402 at or near the ABS 415 for purposes of monitoring temperature, head-medium spacing changes, and head-medium contact.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hot spot 413 over the track of the magnetic medium 411 where writing takes place, as shown in FIG. 4. The light from the source 420 propagates to the NFT 410, e.g., either directly from the source 420 or through the mode converter or by way of a focusing element. Other optical elements, such as couplers, mirrors, prisms, etc., may also be formed integral to the slider.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 413 is on the order of 50 nm or less. Thus, the desired hot spot size is well below half the wavelength of the light. Optical focusers cannot be used to obtain the desired hot spot size, being diffraction limited at this scale. As a result, the NFT 410 is employed to create a hot spot on the media.

The NFT 410 is a near-field optics device configured to generate local surface plasmon resonance at a designated (e.g., design) wavelength. The NFT 410 is generally formed from a thin film of plasmonic material (e.g., gold, silver, copper) on a substrate. In a HAMR slider 402, the NFT 410 is positioned proximate the write pole of the writer 406. The NFT 410 is aligned with the plane of the ABS 415 parallel to the read/write surface of the magnetic medium 411. The NFT 410 achieves surface plasmon resonance in response to the incident electromagnetic energy. The plasmons generated by this resonance are emitted from the NFT 410 towards the magnetic medium 411 where they are absorbed to create the hot spot 413. At resonance, a high electric field surrounds the NFT 410 due to the collective oscillations of electrons at the metal surface (e.g., substrate) of the magnetic medium 411. At least a portion of the electric field surrounding the NFT 410 gets absorbed by the magnetic medium 411, thereby raising the temperature of the spot 413 on the medium 411 as data is being recorded.

Sharing of electrical bond pads is important for magnetic recording heads configured for interlaced magnetic recording, also referred to as interleaved magnetic recording. Recording heads configured for IMR include two writers in addition to one or more readers. One of the writers is wide and the other writer is narrow. Each of the two writers has an associated writer heater. The addition of a second writer and a second heater for thermally actuating the second writer increases the demand for additional bond pads. Embodiments are directed to bond pad sharing for recording heads configured for IMR. Some embodiments are directed to bond pad sharing for recording heads configured for both IMR and HAMR.

Figure 5:
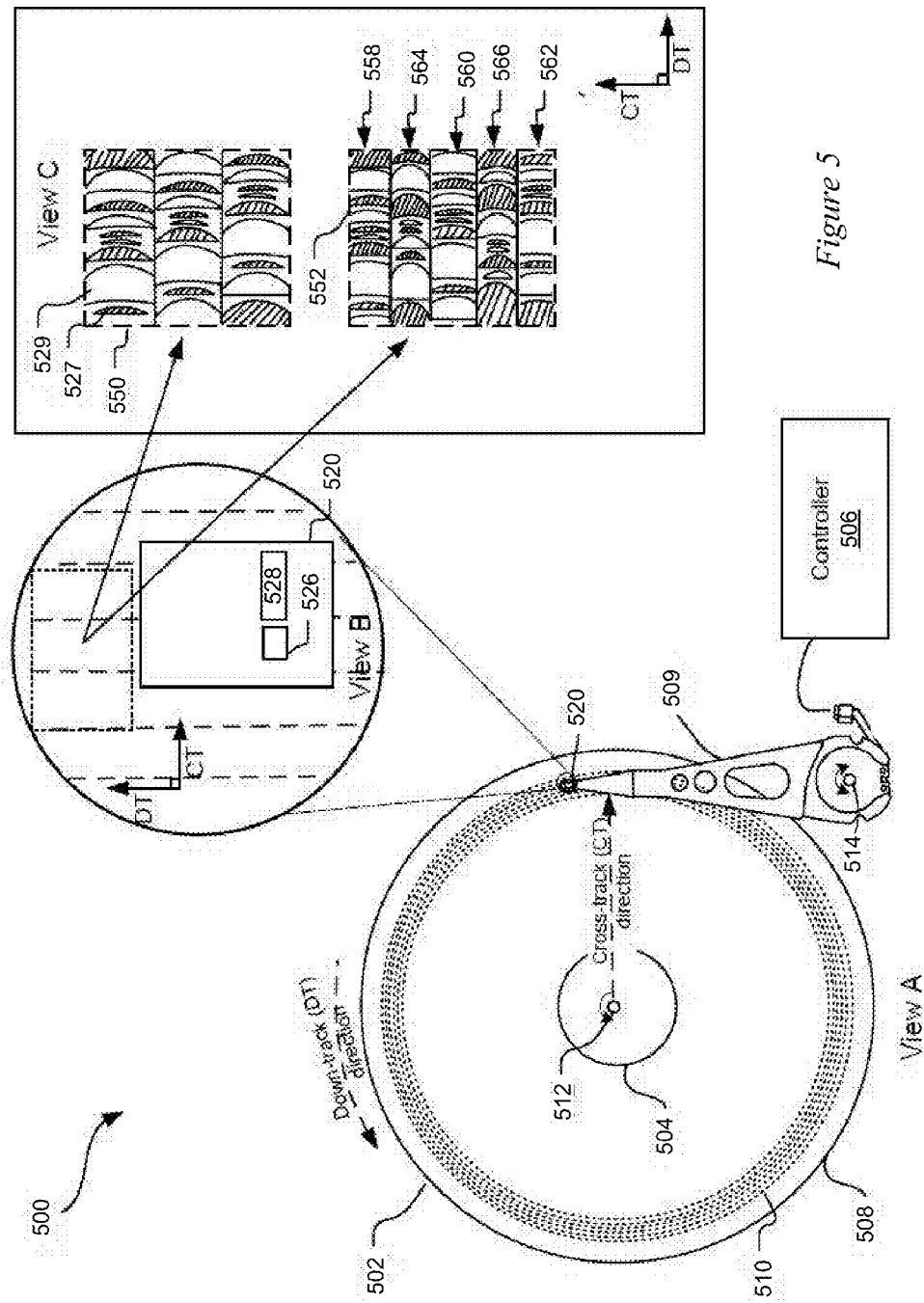
FIG. 5 shows a recording transducer and magnetic recording medium configured to implement interlaced magnetic recording (IMR) in accordance with various embodiments.

FIG. 5 illustrates a data storage device 500 including a recording head 520 for writing data on a magnetic storage medium 508 in accordance with an interlaced magnetic recording methodology. As illustrated in View A of FIG. 5, the storage medium 508 rotates about a spindle center or a disk axis of rotation 112 during rotation, and includes an inner diameter 504 and an outer diameter 502 between which are a number of concentric data tracks 510. Information may be written to and read from data bit locations in the data tracks on the storage medium 508. The recording head 520 is mounted on an actuator assembly 509 at an end distal to an actuator axis of rotation 514. The recording head 520 flies in close proximity above the surface of the storage medium 508 during disk rotation. A seek operation positions the recording head 520 over a target data track for read and write operations.

Referring to View B of FIG. 5, the recording head 520 includes two different writers 526 and 528, also referred to as write elements. The writers 526 and 528 are shown to be in alignment in the cross-track direction; however, other write element configurations are contemplated for use in other implementations. Each of the writers 526 and 528 includes a write pole (not shown) that converts a series of electrical pulses sent from a controller 506 into a series of magnetic pulses of commensurate magnitude and length, and the magnetic pulses selectively magnetize magnetic grains of the rotating magnetic media 508 as they pass below the write element 526 or 528.

View C of FIG. 5 illustrates magnified views 550 and 552 of a same surface portion of the storage media 508 according to different write methodologies and settings of the storage device 500. Specifically, the magnified views 550 and 552 include a number of magnetically polarized regions, also referred to herein as "data bits," along the data tracks of the storage media 508. Each of the data bits (e.g., a data bit 527) represents one or more individual data bits of a same state (e.g., is or Os). For example, the data bit 529 is a magnetically polarized region representing multiple bits of a first state (e.g., "000"), while the adjacent data bit 527 is an oppositely polarized region representing one or more bits of a second state (e.g., a single "1"). The data bits in each of the magnified views 550, 552 are not necessarily illustrative of the actual shapes or separations of the bits within an individual system configuration.

The magnified view 550 in View C of FIG. 5 illustrates magnetic transitions recorded according to a conventional magnetic recording (CMR) technique. In a CMR system, all written data tracks are randomly writeable and of substantially equal width. A random write refers to a write operation to a first data track that does not critically impair (e.g., corrupt or erase) data on either adjacent track. According to one implementation, the recorded data bits of the magnified view 550 are recorded with a same write element (e.g., either the write element 526 or 528) of the recording head 520.

In a CMR system, an achievable linear density (e.g., density along an individual data track) is limited by the size of the write element used to write the data encoded on the storage medium 508. For example, the data bit 527 may represent the smallest data bit recordable by a particular write element. Likewise, a read element (not shown) may have difficulty deciphering the data recorded on the media 508 if the various polarized regions are too small or placed too close to one another.

The magnified view 552 illustrates data bits recorded according to another set of system parameters implementing an interlaced magnetic recording (IMR) technique.

According to one implementation, this IMR technique provides for a higher total areal density capability (ADC) with a lower observable BER than conventional recording systems.

Specifically, the magnified view 552 illustrates alternating data tracks of different track widths and different linear densities. The write element 528 is used to write a first grouping of alternating data tracks (e.g., data tracks 558, 560, and 562) with a wide written track width, while the write element 526 is used to write a second grouping of interlaced data tracks (e.g., the data tracks 564, 566) with a narrower written track width. Data of the narrow, interlaced data tracks overwrites edges of adjacent and previously written data tracks of the wider width.

For example, writing of the data track 564 overwrites data on the adjacent edges of the data tracks 564 and 566. In other words, a defined track pitch (e.g., radial spacing between centers of two directly adjacent data tracks) is by design less than the write width of the wide write element 528 but greater than or approximately equal to the write width of the narrow write element 526.

In another implementation, the first grouping of data tracks (e.g., the data tracks 558, 560, and 562) includes data of a higher linear density than the interlaced tracks (e.g., the data tracks 564 and 566). Other implementations of the disclosed technology may provide for data tracks of three or more different written track widths and/or three or more different linear densities on a same surface of the magnetic storage medium 508.

To generate the IMR pattern shown in magnified view 552, a storage controller 506 of the storage device 500 alters one or more system parameters (e.g., write current, overshoot, waveform, etc.) based on a discrete write location where data is received and stored on the storage medium 508. For example, the storage controller 506 may write even-numbered data tracks on the storage medium 508 with a first linear density and track width and write odd-numbered data tracks on the magnetic media with a second linear density and different track width.

In one implementation, the storage medium 508 is divided radially into zones and each zone is associated with multiple linear densities. For example, two different linear densities may be used to write data of alternating tracks within each individual radial zone. The linear densities used in one radial zone may differ from the linear densities used in any other radial zone of the storage medium 508.

Further, the controller 506 may be configured to systematically direct incoming write commands to different data tracks of the storage medium according to a number of prioritized random access (PRA) rules. For example, the controller 506 selects storage locations for each incoming write command to systematically maximize a total number of possible random writes.

In general, PRA rules dictate an order in which two or more data tracks on the magnetic storage medium 508 are to be written. For example, a PRA rule may specify that a particular data track (center data track) is to be written before either of the data tracks adjacent to the particular data track. In this case, the particular data track is randomly writable if the adjacent data tracks do not contain any data. If however, data is already stored on either of the adjacent data tracks, the data write to the particular data track may include: (1) caching the data on one or both of the adjacent data tracks; (2) writing the particular track; and (3) subsequently, re-writing the data of one or both of the adjacent data tracks. Embodiments that use IMR when writing data can be implemented according to the embodiments disclosed in commonly-owned, co-pending U.S. patent application Ser. No. 14/686,456, filed on Apr. 14, 2015, which claims benefit of priority to U.S. Provisional Application No. 62/083,696, filed on Nov. 24, 2014, and also to commonly-owned, co-pending U.S. patent application Ser. No. 14/686,561, filed on Apr. 14, 2015, which claims benefit of priority to U.S. Provisional Patent Application No. 62/083,732, filed on Nov. 24, 2014, all of which are hereby incorporated herein by reference.

Various embodiments of bond pad sharing by a multiplicity of writers and other electrical components of a slider will now be described in greater detail. In general, embodiments of the disclosure are directed to slider configurations that facilitate bond pad sharing between multiple writers configured for IMR and at least one other electrical component of a slider, such that one, two, or three bond pads are freed up for other uses (or are not needed). Some embodiments are directed to bond pad sharing between multiple writers configured for IMR and at least one other electrical component of a slider configured for HAMR.

According to some embodiments, a slider of a magnetic recording head includes a plurality of electrical bond pads coupled to bias sources. A first writer on the slider is coupled between first and second bond pads, and a second writer on the slider is coupled between third and fourth bond pads. At least one heater is coupled to two of the first, second, third, and fourth bond pad. In some embodiments, the heater is a reader heater, while in other embodiments the heater is a writer heater. In some embodiments, the first and second writers are configured for alternate activation to implement an IMR technique.

In accordance with other embodiments, a slider of a magnetic recording head includes a plurality of electrical bond pads coupled to bias sources. A first writer on the slider is coupled between first and second bond pads. A second writer on the slider is coupled between third and fourth bond pads. The first writer includes a first center-tap, and the second writer includes a second center-tap. A reader heater is coupled between the first and second center-taps.

In some embodiments, a slider of a magnetic recording head includes a plurality of electrical bond pads coupled to bias sources and a ground pad. A first writer having a center-tap is coupled to first and second bond pads. A second writer having a center-tap is coupled to third and fourth bond pads. A first writer heater is coupled between the center-tap of the second writer and the ground pad. A second writer heater is coupled between the center-tap of the first writer and the ground pad. In some embodiments, the first and second writers and writer heaters are configured for alternate activation to implement an IMR technique. In one IMR write mode, differential biasing of the first writer activates the first writer and renders the second writer heater inactive, while common mode biasing of the second writer activates the first writer heater and renders the second writer inactive. In another IMR write mode, differential biasing of the second writer activates the second writer and renders the first writer heater inactive, while common mode biasing of the first writer activates the second writer heater and renders the first writer inactive.

In accordance with further embodiments, a slider of a magnetic recording head includes a plurality of electrical bond pads coupled to bias sources and a ground pad. A first writer having a center-tap is coupled to first and second bond pads. A second writer having a center-tap is coupled to third and fourth bond pads. A first writer heater is coupled between the center-tap of the second writer and the ground pad. A first diode is coupled between the center-tap of the second writer and the first writer heater. A second writer heater is coupled between the center-tap of the first writer and the ground pad. A second diode is coupled between the center-tap of the first writer and the second writer heater. A resistive component (e.g., a reader heater or a contact sensor) is coupled between the center-tap of first writer and the center-tap of the second writer. A third diode is coupled between the center-tap of the first writer and the resistive component. In one IMR write mode, differential biasing of the first writer activates the first writer and renders the second writer heater inactive, while common mode biasing of the second writer activates the first writer heater and renders the second writer inactive. In another IMR write mode, differential biasing of the second writer activates the second writer and renders the first writer heater inactive, while common mode biasing of the first writer activates the second writer heater and renders the first writer inactive. In a read mode, common mode biasing of the first and second writers activates the resistive component and renders inactive the first and second writers and the first and second writer heaters.

Figure 6A:
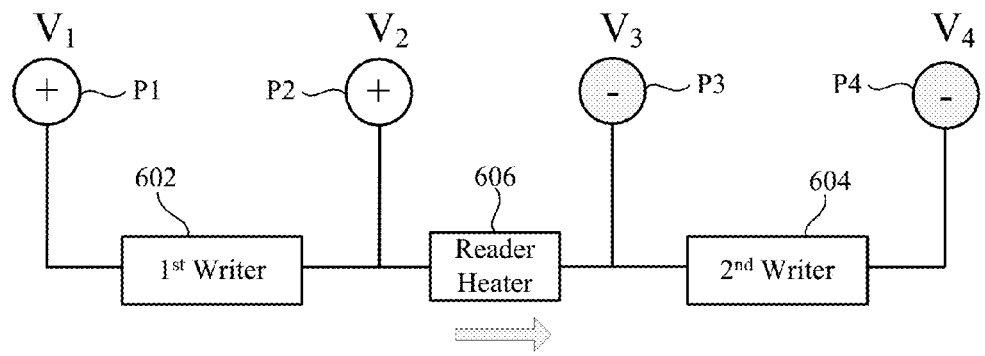
FIGS. 6A, 6B, and 6C illustrate circuits that support bond pad sharing between a multiplicity of writers and a resistive component in accordance with various embodiments.
Figure 6B:
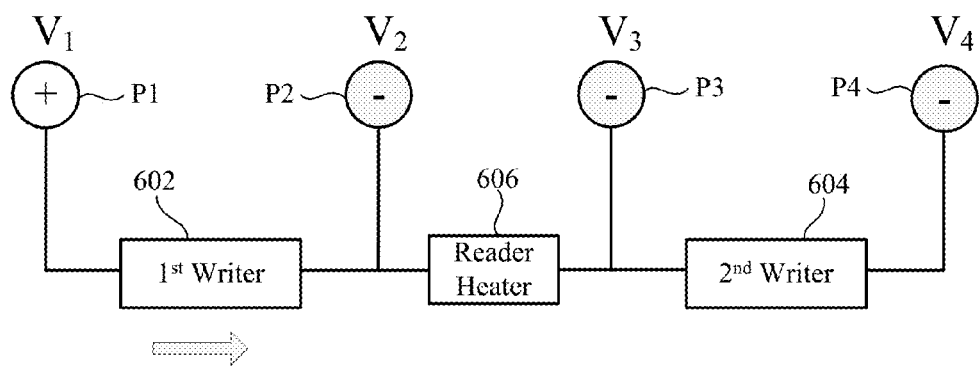
Figure 6C:
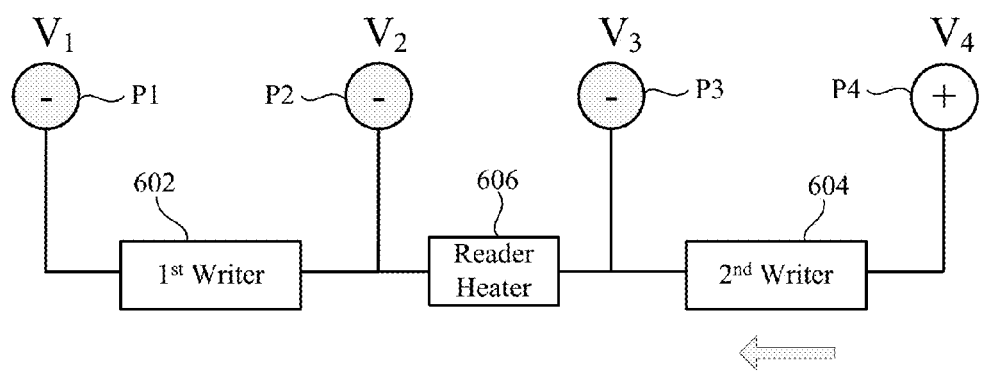

FIGS. 6A-6C illustrate circuits that support bond pad sharing between a multiplicity of writers and a heater of a slider in accordance with various embodiments. In particular, FIGS. 6A-6C illustrate circuitry configured to facilitate bond pad sharing between a first writer 602, a reader heater 606, and a second writer 604. The first and second writers 602 and 604 are configured to implement an IMR technique in accordance with various embodiments. For example, the first writer 602 may be a narrow writer, such as writer 526 shown in FIG. 5. The second writer 604 may be a wide writer, such as writer 528 shown in FIG. 5. In the circuitry shown in FIGS. 6A-6C, the reader heater 606 is coupled between the first and second writers 602 and 604, and is configured to thermally actuate a reader of the slider. The reader heater 606 is typically a resistive load, such as a metal wire.

In FIGS. 6A-6C, four bond pads, P1, P2, P3, and P4, are shown for illustrative purposes. Bond pads P1-P4 can be individually biased in a number of ways, such as by providing a positive voltage, a negative voltage, or a potential equivalent to that of the ground pad at each bond pad, for example. The first writer 602 is coupled between bond pads P1 and P2. The second writer 604 is coupled between bond pads P3 and P4. The reader heater 606 is coupled between bond pads P2 and P3. Because the reader heater 602 and the first writer 602 are both coupled to bond pad P2, bond pad P2 is considered a shared bond pad. Similarly, because the reader heater 602 and the second writer 604 are both coupled to bond pad P3, bond pad P3 is considered the shared bond pad. The bond pad sharing configuration shown in FIGS. 6A-6C provides for a reduction of one bond pad for a single-ended reader heater configuration.

FIG. 6A shows the circuit operating in a read mode. In a read mode, the reader heater 606 is active, and the first and second writers 602 and 604 are inactive. This can be achieved by biasing the bond pads P1-P4 in the manner shown in FIG. 6A. More particularly, the voltage $V_2$ at bond pad P2 is positive, while the voltage $V_3$ at bond pad P3 is negative. As such, current flows through the reader heater 606. At the same time, the voltage $V_1$ at bond pad P1 is positive and preferably the same magnitude as the positive voltage $V_2$ at bond pad P2. Because the voltages $V_1$ and $V_2$ have the same polarity and magnitude, the first writer 602 is inactive for writing. Similarly, the voltage $V_3$ at bond pad P3 is negative and preferably the same magnitude as the negative voltage $V_4$ at bond pad P4. Because the voltages $V_3$ and $V_4$ have the same polarity and magnitude, the second writer 604 is inactive for writing. It is noted that the polarities of $V_1$ and $V_2$ can be switched with those of $V_3$ and $V_4$ to provide similar functionality.

FIG. 6B illustrates the circuitry operating in a first write mode in which the first writer 602 is active, the second writer 604 is inactive, and the reader heater 606 is inactive. As shown in FIG. 6B, the voltage $V_3$ at bond pad P3 is negative and preferably the same magnitude as the voltage $V_4$ at bond pad P4, such that the second writer 604 is inactive for writing. The voltages $V_2$ and $V_3$ at bond pads P2 and P3 are both negative and of equal magnitude, such that no current flows through the reader heater 606. The voltage $V_1$ at bond pad P1 is positive and, because the voltage $V_2$ at bond pad P2 is negative, the first writer 602 is active for writing. It is noted that the voltages $V_1$ and $V_2$ at bond pads P1 and P2 are voltages needed during writing. For simplicity, $V_1$ is shown as a positive voltage and $V_2$ is shown as a negative voltage.

According to one biasing approach, the voltage $V_2$ at bond pad P2 can be a fixed DC potential <0 V (and equal to $V_2$ and $V_3$), and $V_1$ can be varied relative to $V_2$ to provide the required write waveform (e.g., $V_1$-$V_2$). According to another biasing approach, an AC (write) potential can be applied across the bond pads P1 and P2, and the voltages $V_3$ and $V_4$ at bond pads P3 and P4 can be set equal to, and varied synchronously with, that at bond pad P2.

FIG. 6C illustrates the circuitry operating in a second write mode in which the second writer 604 is active, the first writer 604 is inactive, and the reader heater 606 is inactive. As can be seen in FIG. 6C, the voltage $V_1$ at bond pad P1 is negative and preferably the same magnitude as the voltage $V_2$ at bond pad P2, such that the first writer 602 is inactive for writing. The voltages $V_2$ and $V_3$ at bond pads P2 and P3 are both negative and of equal magnitude, such that no current flows through the reader heater 606. The voltage $V_3$ at bond pad P3 is negative and, because the voltage $V_4$ at bond pad P4 is positive, the second writer 602 is inactive for writing. It is noted that the voltages $V_3$ and $V_4$ at bond pads P3 and P4 are voltages needed during writing. For simplicity, $V_4$ is shown as a positive voltage and $V_3$ is shown as a negative voltage. It is further noted that the voltages $V_1$-$V_4$ that drive the first and second writers 602 and 604 during write operations are complex AC waveforms.

According to one biasing approach, the voltage $V_3$ at bond pad P3 can be a fixed DC potential <0 V (and equal to $V_1$ and $V_2$), and $V_4$ can be varied relative to $V_3$ to provide the required write waveform (e.g., $V_4$-$V_3$). According to another biasing approach, an AC (write) potential can be applied across the bond pads P4 and P3, and the voltages $V_1$ and $V_2$ at bond pads P1 and P2 can be set equal to, and varied synchronously with, that at bond pad P3.

Figure 6D:
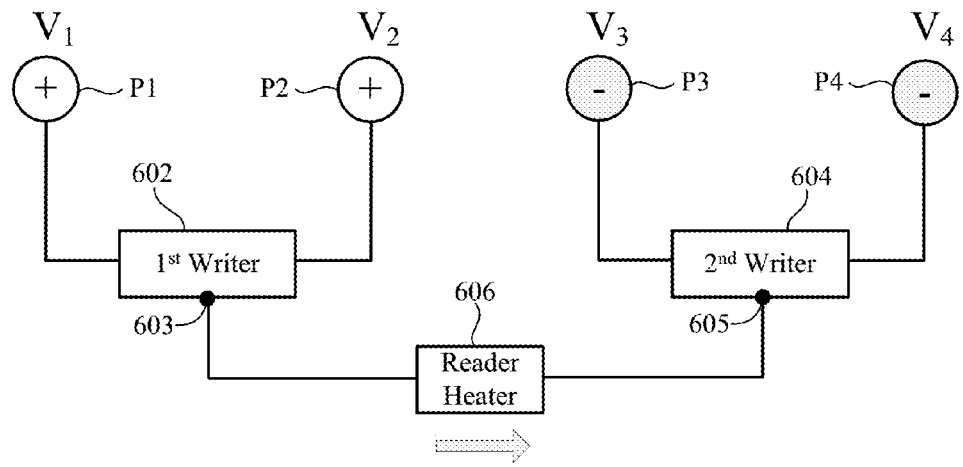
FIGS. 6D, 6E, and 6F illustrate circuits that support bond pad sharing between a multiplicity of writers and a resistive component in accordance with various embodiments.
Figure 6E:
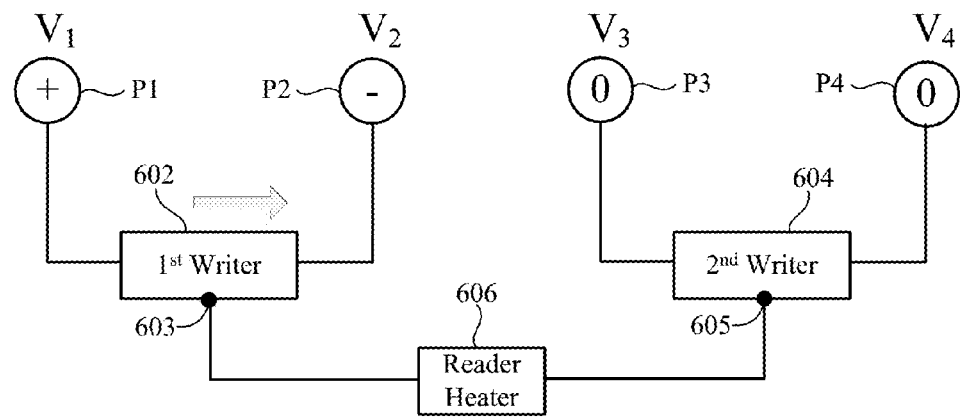
Figure 6F:
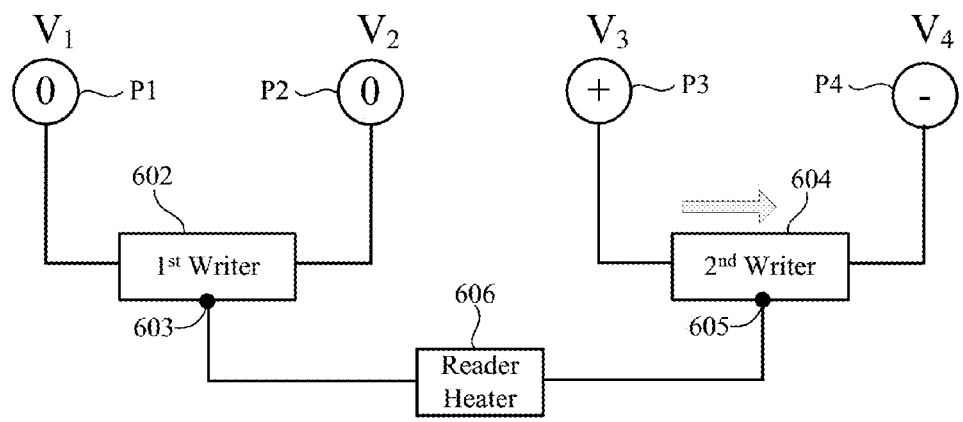

FIGS. 6D-6F illustrate circuits that support bond pad sharing between a multiplicity of writers and a heater of a slider in accordance with various embodiments. In particular, FIGS. 6D-6F illustrate circuitry configured to facilitate bond pad sharing between a first writer 602, a reader heater 606, and a second writer 604. The first and second writers 602 and 604 are configured to implement an IMR technique in accordance with various embodiments. FIG. 6D shows the circuit in a read mode, during which the reader heater 606 is active and the first and second writers 602 and 604 are inactive. FIG. 6E shows the circuit in a write-1 mode, during which the first writer 602 is active, and the reader heater 606 and the second writer 604 are inactive. FIG. 6F shows the circuit in a write-2 mode, during which the second writer 604 is active, and the reader heater 606 and the first writer 602 are inactive.

The first writer 602 is fabricated to include a center-tap 603, and the second writer 604 is fabricated to include a center-tap 605. Each of the center-taps 603 and 605 is positioned at the electrical center of the first and second writers 602 and 604, respectively. It is understood that the electrical center of the first and second writers 602 and 604 may or may not be coincident with the physical center of the first and second writers 602 and 604. For example, the electrical center of the first and second writers 602 and 604 may be at a writer coil location or other location between the writer coil and the writer bond pad which is different from the physical center of the writers 602 and 604. As is further shown in FIGS. 6D-6F, the reader heater 606 is coupled between the center-tap 605 of the first writer 602 and the center-tap 605 of the second writer 604.

As was discussed above, FIG. 6D shows the circuit in a read mode. With the center-taps 603 and 605 positioned at the electrical centers of the first and second writers 602 and 604, and with the voltages $V_1$-$V_4$ having the polarities shown at bond pads P1-P4, the first and second writers 602 and 604 are inactive for writing. Given this common mode biasing at bond pads P1 and P2 (both positive) and at bond pads P3 and P4 (both negative), a potential different is created between the center-taps 603 and 605, and current flows through the reader heater 606.

In the write-1 mode, as shown in FIG. 6E, the voltages $V_1$ and $V_2$ at bond pads P1 and P2 are voltages needed during writing. It is noted that $V_1$ is shown as a positive voltage and $V_2$ is shown as a negative voltage for simplicity. As such, the first writer 602 is active. A zero potential is presented as voltages $V_3$ and $V_4$ at bond pads P3 and P4. Alternatively, equal but opposite DC potentials can be presented at bond pads P3 and P4. As such, the second writer 604 is inactive. Also, no current flows through the reader heater 606, since the center-taps 603 and 605 are at the same potential (e.g., 0 V).

In the write-2 mode, as shown in FIG. 6F, the voltages $V_3$ and $V_4$ at bond pads P3 and P4 are voltages needed during writing. It is noted that $V_3$ is shown as a positive voltage and $V_4$ is shown as a negative voltage for simplicity. As such, the second writer 604 is active. A zero potential is presented as voltages $V_1$ and $V_2$ at bond pads P1 and P2. Alternatively, equal but opposite DC potentials can be presented at bond pads P1 and P2. As such, the first writer 602 is inactive. Also, no current flows through the reader heater 606, since the center-taps 603 and 605 are at the same potential (e.g., 0 V).

Figure 7A:
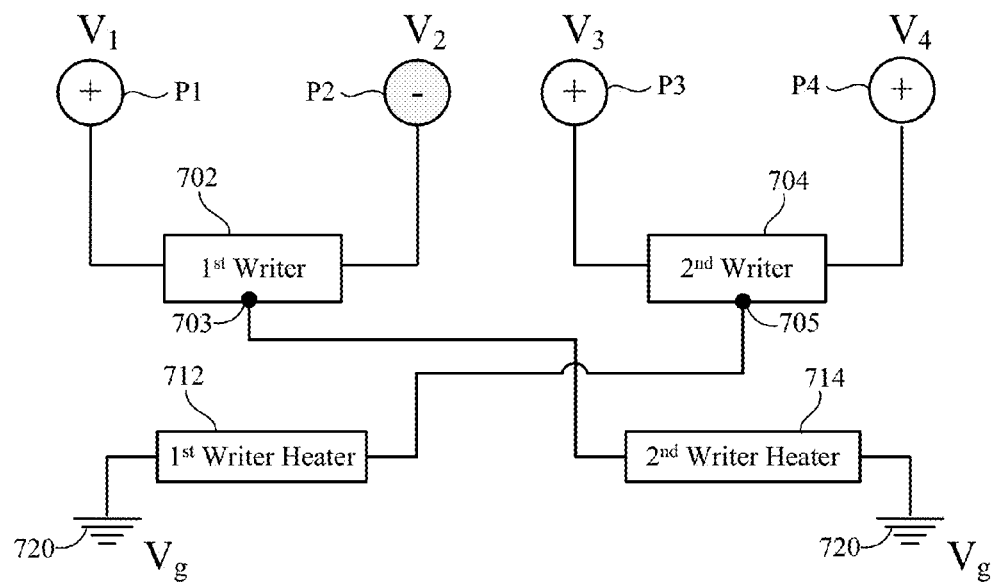
FIGS. 7A and 7B illustrate circuits that support bond pad sharing between a multiplicity of writers and a multiplicity of writer heaters in accordance with various embodiments.
Figure 7B:
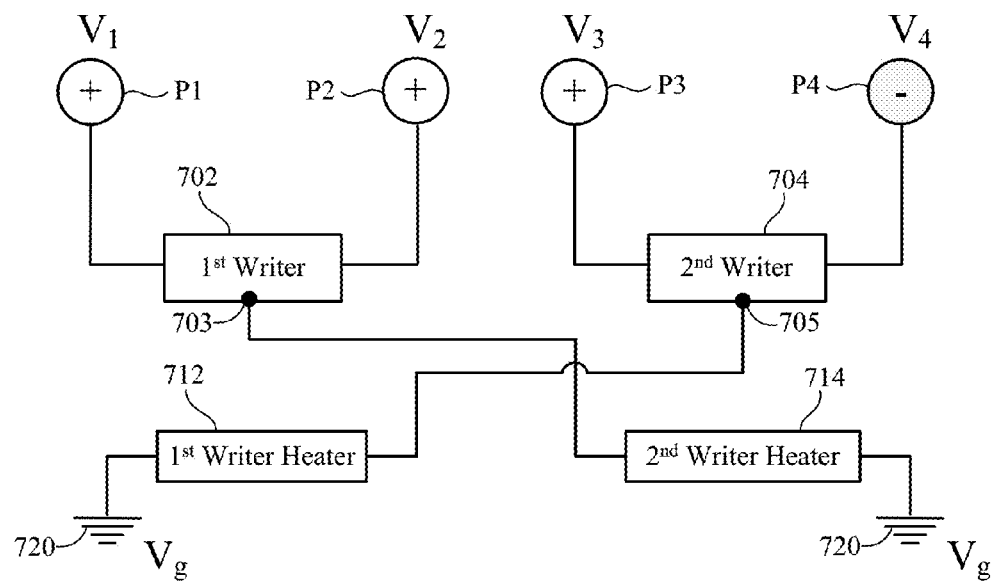

FIGS. 7A and 7B illustrate circuits that support bond pad sharing between a multiplicity of writers and multiple heaters of a slider in accordance with various embodiments. In particular, FIGS. 7A and 7B illustrate circuitry configured to facilitate bond pad sharing between a first writer 702, a second writer 704, a first writer heater 712, and a second writer heater 714. The first and second writers 702 and 704 are configured to implement an IMR technique in accordance with various embodiments. For example, the first writer 702 may be a narrow writer, and the second writer 704 may be a wide writer. Each of the first and second writer heaters 712 and 714 is typically a resistive load, such as a metal wire. The bond pad sharing configuration shown in FIGS. 7A and 7B provides for a reduction of two bond pads for a single-ended writer heater configuration.

FIG. 7A shows the circuit in a first write mode, in which the first writer 702 and the first writer heater 712 are active, and the second writer 704 and the second writer heater 714 are inactive. This can be achieved by providing a positive voltage, $V_1$, at bond pad P1 and a negative voltage, $V_2$, at bond pad P2, while providing positive voltages $V_3$ and $V_4$ of equal magnitude at bond pads P3 and P4. It is noted that the voltages $V_1$ and $V_2$ at bond pads P1 and P2 are voltages needed during writing, and that $V_1$ is shown as a positive voltage and $V_2$ is shown as a negative voltage for simplicity. As such, the first writer 702 is active for writing, current flows through the first writer heater 712, the second writer 704 is inactive for writing, and no current flows through the second writer heater 714.

The first writer 702 is fabricated to include a center-tap 703, and the second writer 704 is fabricated to include a center-tap 705. Each of the center-taps 703 and 705 is positioned at the electrical center of the first and second writers 702 and 704, respectively. As was previously discussed, the electrical center of the first and second writers 702 and 704 may or may not be coincident with the physical center of the first and second writers 702 and 704.

As is further shown in FIGS. 7A and 7B, a first writer heater 712 is coupled between the center-tap 705 of the second writer 704 and a ground pad 720. A second writer heater 714 is coupled between the center-tap 703 of the first writer 702 and the ground pad 720. The potential of the ground pad 720 is shown as the voltage $V_g$. With the center-tap 703 positioned at the electrical center of the first writer 702, and with voltages $V_1$ and $V_2$ having the polarities shown at bond pads P1 and P2, the first writer 702 is active for writing but no current flows from the center-tap 703 to the second writer heater 714. Concurrently, positive (or negative) voltages $V_3$ and $V_4$ of equal magnitude are provided at bond pads P3 and P4. Given this common mode biasing at bond pads P3 and P4, the second writer 704 is inactive for writing. However, the common mode biasing of bond pads P3 and P4 produces a voltage at the center-tap 705, causing current to flow between the center-tap 705 of the second writer 704 and the first writer heater 712. As such, the first writer heater 712 is active at the same time as the first writer 702, notwithstanding that the power source for the first writer heater 712 is the second writer 704.

FIG. 7B shows the circuit in a second write mode, in which the second writer 704 and the second writer heater 714 are active, and the first writer 702 and the first writer heater 712 are inactive. This can be achieved by providing a positive voltage, $V_3$, at bond pad P3 and a negative voltage, $V_4$, at bond pad P4, while providing positive (or negative) voltages $V_1$ and $V_2$ of equal magnitude at bond pads P1 and P2. It is noted that the voltages $V_3$ and $V_4$ at bond pads P3 and P4 are voltages needed during writing, and that $V_3$ is shown as a positive voltage and $V_4$ is shown as a negative voltage for simplicity. With the center-tap 705 positioned at the electrical center of the second writer 704, and with voltages $V_3$ and $V_4$ having opposite polarities as shown at bond pads P3 and P4, the second writer 704 is active for writing but no current flows from the center-tap 705 to the first writer heater 712. Concurrently, positive (or negative) voltages $V_1$ and $V_2$ of equal magnitude are provided at bond pads P1 and P2. Given this common mode biasing of bond pads P1 and P2, the first writer 702 is inactive for writing. However, the common mode biasing of bond pads P1 and P2 produces a voltage at the center-tap 703, causing current to flow between the center-tap 703 of the first writer 702 and the second writer heater 714. As such, the second writer heater 714 is active at the same time as the second writer 704, notwithstanding that the power source for the second writer heater 714 is the first writer 702.

Figure 8A:
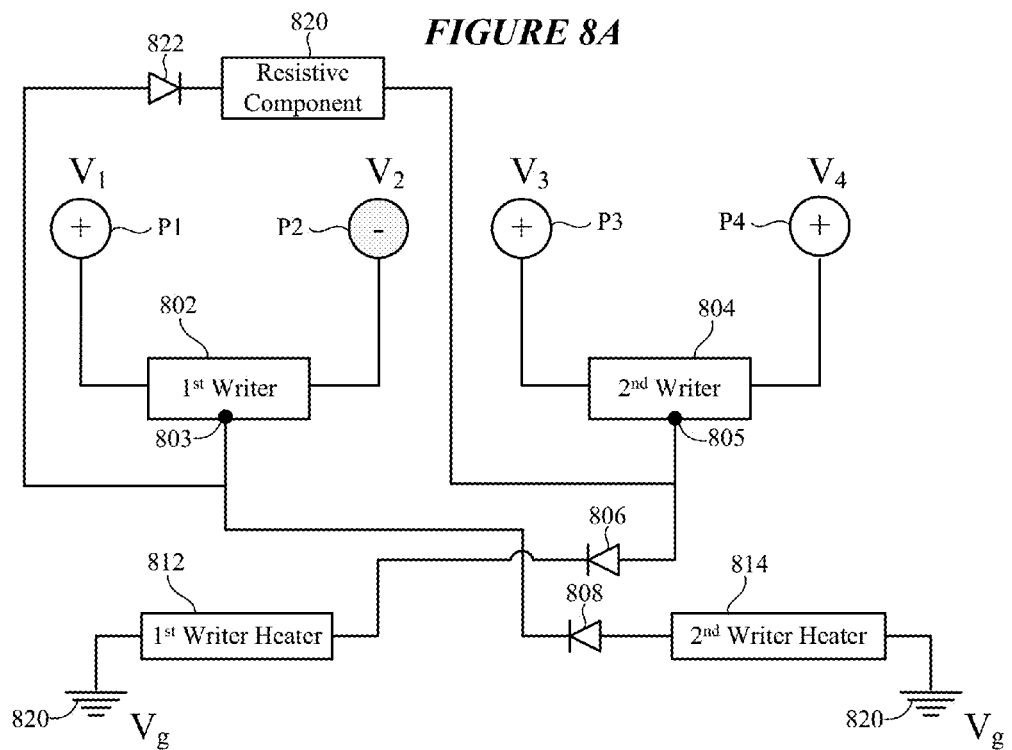
Figure 8B:
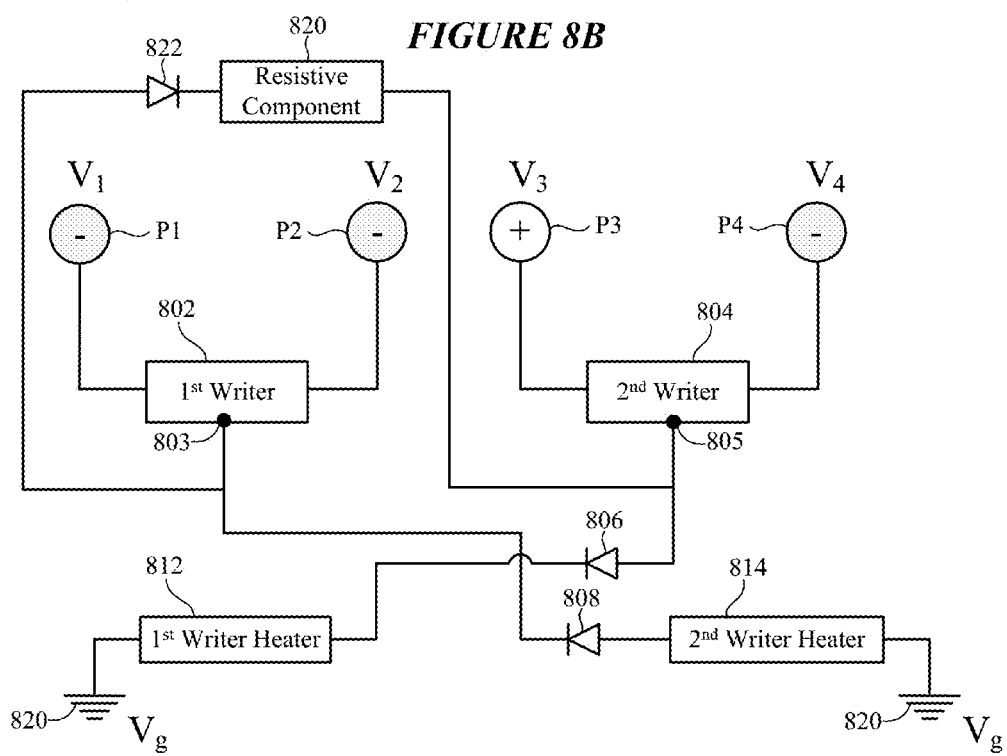

FIGS. 8A-8C illustrate circuits that support bond pad sharing between a multiplicity of writers and multiple resistive components of a slider in accordance with various embodiments. In particular, FIGS. 8A-8C illustrate circuitry configured to facilitate bond pad sharing between a first writer 802, a second writer 804, a first writer heater 812, a second writer heater 814, and a resistive component 820. The circuitry shown in FIGS. 8A-8C is configured to operate in three modes; a first write mode, a second write mode, and a read mode.

In some embodiments, the resistive component 820 is a reader heater. The reader heater (e.g., a resistive load, such as a metal wire) is typically used to thermally actuate the reader of the slider during read operations, and can also be activated when setting clearance of the slider. In other embodiments, the resistive component 820 is a contact sensor, such as a contact sensor situated at the air bearing surface of the slider at or near a close point of the reader. The contact sensor can be configured to sense for one or both of head-medium contact and thermal asperities. The contact sensor can be implemented as a thermal sensor, such as a resistive temperature sensor (e.g., TCR sensor), for example. As shown, the contact sensor is implemented as a DETCR (dual-ended TCR sensor). The contact sensor can be implemented using other technologies, such as a thermocouple or a thermistor.

The first and second writers 802 and 804 are configured to implement an IMR technique in accordance with various embodiments. For example, the first writer 802 may be a narrow writer, and the second writer 804 may be a wide writer. The bond pad sharing configuration shown in FIGS. 8A-8C provides for a reduction of three bond pads for a single-ended heater configuration, where the resistive component 820 is a reader heater. In embodiments where the resistive component is a dual-ended contact sensor (e.g., DETCR), the bond pad sharing configuration shown in FIGS. 8A-8C provides for a reduction of four bond pads.

FIG. 8A shows the circuit in a first write mode, in which the first writer 802 and the first writer heater 812 are active, and the second writer 804, the second writer heater 814, and the resistive component 820 are inactive. This can be achieved by providing voltages $V_1$ and $V_2$ at bond pads P1 and P2 that are needed during writing, and positive voltages $V_3$ and $V_4$ of equal magnitude at bond pads P3 and P4. It is noted that the voltages $V_1$ and $V_2$ at bond pads P1 and P2 are voltages needed during writing, and that $V_1$ is shown as a positive voltage and $V_2$ is shown as a negative voltage for simplicity. As such, the first writer 802 is active for writing, current flows through the first writer heater 812, the second writer 804 is inactive for writing, and no current flows through the second writer heater 814 and the resistive component 820.

Each of the first and second writers 802 and 804 is fabricated to include a center-tap 803 and 804, respectively. Each of the center-taps 803 and 805 is positioned at the electrical center of the first and second writers 802 and 804, respectively. As is further shown in FIGS. 8A-8C, the first writer heater 812 is coupled between the center-tap 805 of the second writer 804 and a ground pad 820. A first diode 806 is coupled between the center-tap 805 and the first writer heater 812. More particularly, an anode of the first diode 806 is coupled to the center-tap 805, and a cathode of the first diode 806 is coupled to the first writer heater 812. The second writer heater 814 is coupled between the center-tap 803 of the first writer 802 and the ground pad 820. A second diode 808 is coupled between the center-tap 803 and the second writer heater 814. More particularly, a cathode of the second diode 808 is coupled to the center-tap 803, and an anode of the second diode 808 is coupled to the second writer heater 812. Inclusion of the diodes 806 and 808 in the circuitry shown in FIGS. 8A-8C facilitates the tri-modal operation and bond pad reduction achieved by this circuitry.

With the center-tap 803 positioned at the electrical center of the first writer 802, and with voltages $V_1$ and $V_2$ having the polarities shown at bond pads P1 and P2, the first writer 802 is active for writing but no current flows from the center-tap 803 to the second writer heater 814. It is noted that that the diode 808 would be reversed biased to any current flowing from center-tap 803 when the potential at the center-tap 803 is higher than $V_g$ at the ground pad 820. Concurrently, positive voltages $V_3$ and $V_4$ of equal magnitude are provided at bond pads P3 and P4. Given this common mode biasing at bond pads P3 and P4, the second writer 804 is inactive for writing. However, the common mode biasing of bond pads P3 and P4 produces a voltage at the center-tap 805, causing current to flow between the center-tap 805 of the second writer 804 and the first writer heater 812 via the diode 806.

FIG. 8B shows the circuit in a second write mode, in which the second writer 804 and the second writer heater 814 are active, and the first writer 802, the first writer heater 812, and the resistive component 820 are inactive. This can be achieved by providing a positive voltage, $V_3$, at bond pad P3 and a negative voltage, $V_4$, at bond pad P4, while providing negative voltages $V_1$ and $V_2$ of equal magnitude at bond pads P1 and P2. It is noted that the voltages $V_3$ and $V_4$ at bond pads P3 and P4 are voltages needed during writing, and that $V_3$ is shown as a positive voltage and $V_4$ is shown as a negative voltage for simplicity.

With the center-tap 805 positioned at the electrical center of the second writer 804, and with voltages $V_3$ and $V_4$ having opposite polarities as shown at bond pads P3 and P4, the second writer 804 is active for writing but no current flows from the center-tap 805 to the first writer heater 812. Concurrently, negative voltages $V_1$ and $V_2$ of equal magnitude are provided at bond pads P1 and P1. Given this common mode biasing of bond pads P1 and P2, the first writer 802 is inactive for writing. However, the common mode biasing of bond pads P1 and P2 produces a negative voltage at the center-tap 805, causing current to flow between the ground pad 820, the second writer heater 814, the diode 808, and the center-tap 803 of the first writer 802.

FIG. 8C shows the circuit in a read mode, in which the resistive component 820 is active and the first writer 802, the second writer 804, the first writer heater 812, and the second writer heater 814 are inactive. This can be achieved by providing a positive voltage $V_1$ and $V_2$ at bond pads P1 and P2, and a negative voltage $V_2$ and $V_4$ at bond pads P3 and P4. Given the common mode biasing of bond pads P1 and P2 (both positive) and bond pads P3 and P4 (both negative) shown in FIG. 8C, a positive potential is developed at the center-tap 803 of the first writer 802, and a negative potential is developed at the center-tap 805 of the second writer 802. Given the potential difference between the center-taps 803 and 805, the diode 822 is forward biased, allowing current to flow through the resistive component 820.

Given the common mode biasing of bond pads P1 and P2 ($V_1=V_2$ and both positive), the first writer 802 is inactive for writing. Although the potential at the center-tap 803 is greater than that of $V_g$ at the ground pad 820, the diode 808 is reversed biased, preventing current from flowing through the second writer heater 814. Given the common mode biasing of bond pads P3 and P4 ($V_3=V_4$ and both negative), the second writer 804 is inactive for writing. Although the potential at the center-tap 805 is lower than that of Vg at the ground pad 820, the diode 806 is reversed biased, preventing current from flowing through the first writer heater 812. It is noted that a transistor (e.g., bipolar junction transistor or field-effect transistor) can be used as a substitute for the diodes shown in FIGS. 8A-8C.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider of a magnetic recording head comprising a plurality of electrical bond pads coupled to bias sources;
   a first writer on the slider coupled between first and second bond pads;
   a second writer on the slider coupled between third and fourth bond pads; and
   at least one heater coupled to two of the first, second, third, and fourth bond pads.

2. The apparatus of claim 1, wherein the at least one heater comprises a reader heater.

3. The apparatus of claim 2, wherein:
   the first writer comprises a first center-tap;
   the second writer comprises a second center-tap; and
   the reader heater is coupled between the first and second center-taps.

4. The apparatus of claim 1, wherein the at least one heater comprises a writer heater.

5. The apparatus of claim 1, wherein:
   the second and third bond pads are shared bond pads; and
   the at least one heater comprises a reader heater coupled between the second and third bond pads.

6. The apparatus of claim 1, wherein the recording head is configured for interlaced magnetic recording.

7. The apparatus of claim 1, wherein the recording head is configured for interlaced magnetic recording and heat-assisted magnetic recording.

8. An apparatus, comprising:
   a slider of a magnetic recording head comprising a plurality of electrical bond pads coupled to bias sources and a ground pad;
   a first writer having a center-tap and coupled to first and second bond pads;
   a second writer having a center-tap and coupled to third and fourth bond pads;
   a first writer heater coupled between the center-tap of the second writer and the ground pad; and
   a second writer heater coupled between the center-tap of the first writer and the ground pad.

9. The apparatus of claim 8, wherein the first writer and first writer heater are activated alternately with respect to the second writer and the second writer heater.

10. The apparatus of claim 8, wherein:
    differential biasing of the first writer activates the first writer and renders the second writer heater inactive; and
    common mode biasing of the second writer activates the first writer heater and renders the second writer inactive.

11. The apparatus of claim 10, wherein:
    differential biasing of the second writer activates the second writer and renders the first writer heater inactive; and
    common mode biasing of the first writer activates the second writer heater and renders the first writer inactive.

12. The apparatus of claim 8, wherein the recording head is configured for interlaced magnetic recording.

13. The apparatus of claim 8, wherein the recording head is configured for interlaced magnetic recording and heat-assisted magnetic recording.

14. An apparatus, comprising:
    a slider of a magnetic recording head comprising a plurality of electrical bond pads coupled to bias sources and a ground pad;
    a first writer having a center-tap and coupled to first and second bond pads;
    a second writer having a center-tap and coupled to third and fourth bond pads;
    a first writer heater coupled between the center-tap of the second writer and the ground pad;
    a first diode coupled between the center-tap of the second writer and the first writer heater;
    a second writer heater coupled between the center-tap of the first writer and the ground pad;
    a second diode coupled between the center-tap of the first writer and the second writer heater;
    a resistive component comprising a reader heater or a contact sensor coupled between the center-tap of first writer and the center-tap of the second writer; and
    a third diode coupled between the center-tap of the first writer and the resistive component.

15. The apparatus of claim 14, wherein the first writer and first writer heater are activated alternately with respect to the second writer and the second writer heater.

16. The apparatus of claim 14 wherein the first and second diodes are arranged to limit electrical noise from the ground pad.

17. The apparatus of claim 14, wherein:
    differential biasing of the first writer activates the first writer and renders the second writer heater inactive; and
    common mode biasing of the second writer activates the first writer heater and renders the second writer inactive.

18. The apparatus of claim 17, wherein:
    differential biasing of the second writer activates the second writer and renders the first writer heater inactive; and
    common mode biasing of the first writer activates the second writer heater and renders the first writer inactive.

19. The apparatus of claim 14, wherein common mode biasing of the first and second writers activates the resistive component and renders inactive the first and second writers and the first and second writer heaters.

20. The apparatus of claim 14, wherein:
the first diode comprises an anode coupled to the center-tap of the second writer and a cathode coupled to the first writer heater;
the second diode comprises an anode coupled to the second writer heater and a cathode coupled to the center-tap of the first writer; and
the third diode comprises an anode coupled to the center-tap of the first writer and a cathode coupled to the resistive component.

21. The apparatus of claim 14, wherein the recording head is configured for interlaced magnetic recording.

22. The apparatus of claim 14, wherein the recording head is configured for interlaced magnetic recording and heat-assisted magnetic recording.

* * * * *